Dec. 18, 1923.
E. H. COONEY ET AL
1,478,204
COMBINED SHOVEL AND HOE
Filed Feb. 23, 1922
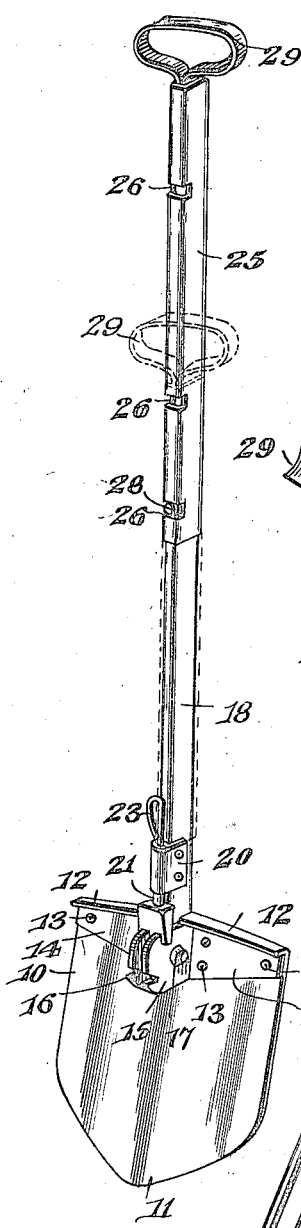
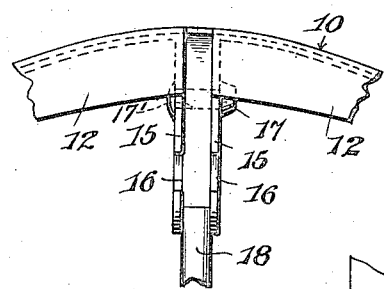
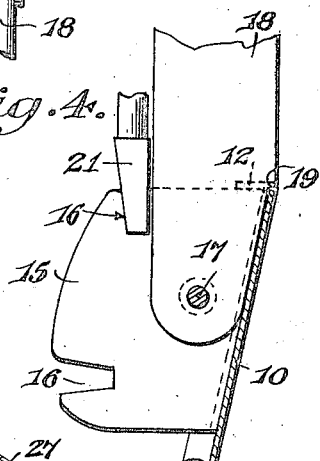
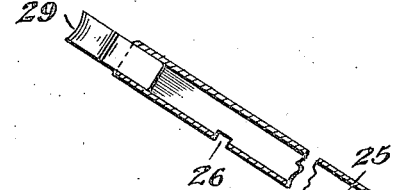
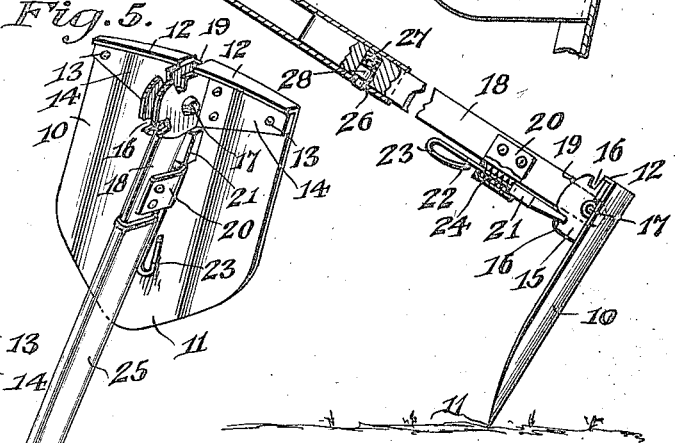
E. H. Cooney
Hildore C. Eklund  INVENTORS
S. T. Wiprud,
BY
Geo. P. Kimmel
ATTORNEY.

Patented Dec. 18, 1923.

1,478,204

UNITED STATES PATENT OFFICE.

EDWARD H. COONEY, HILDORE C. EKLUND, AND SVEN T. WIPRUD, OF GREAT FALLS, MONTANA; SAID COONEY ASSIGNOR TO SAID EKLUND.

COMBINED SHOVEL AND HOE.

Application filed February 23, 1922. Serial No. 538,584.

*To all whom it may concern:*

Be it known that we, EDWARD H. COONEY, HILDORE C. EKLUND, and SVEN T. WIPRUD, citizens of the United States, residing at Great Falls, in the county of Cascade and State of Montana, have invented certain new and useful Improvements in Combined Shovels and Hoes, of which the following is a specification.

This invention relates to combined hoes and shovels, and has for one of its objects to provide a simply constructed implement which may be readily changed from a shovel to a hoe or from a hoe to a shovel without detaching any of the parts.

Another object of the invention is to provide a device of this character including a collapsible and extensible handle of novel construction.

With these and other objects in view, the invention consists in certain novel features of construction as hereinafter shown and described and then specifically pointed out in the claim, and in the drawings illustrative of the preferred embodiment of the invention:—

Figure 1 is a perspective view of the improved implement.

Fig. 2 is a longitudinal sectional elevation.

Figs. 3 and 4 are enlarged details illustrating the construction more fully.

Fig. 5 is a perspective view of the improved implement collapsed.

The improved implement is designed more particularly for use in connection with motor driven vehicles, to assist in digging them out when "mired," and may be carried when collapsed in the tool boxes of such vehicles.

The improved device comprises an earth engaging blade, represented as a whole at 10, and preferably pointed at one end as at 11, and likewise preferably curved transversely.

At its "butt" end the blade is outturned to provide a supporting flange 12, to strengthen and stiffen the blade.

Attached by rivets or other fastening devices 13 to the blade 10 next to the flange 12, are reinforcing and attaching plates having body portions 14, said body portions being outturned at their inner ends to form a pair of opposed forwardly projecting spaced lugs 15, notched as at 16. Apertures 16' in the lugs 15 provide for the passage of a bolt 17 to pivotally connect the shank of a handle 18 therebetween, the said shank is provided with a stop shoulder 19 to engage the adjacent edge of the blade 10 when the latter is arranged as a shovel, as illustrated in Figs. 1 and 4, to limit the movement in one direction.

Attached to the shank 18 near its pivoted end is a U-shaped clip 20 to form a guide for a pawl member 21, the latter having a rod 22 extending therefrom and terminating in pull eye 23, and the pawl member yieldably held by a spring 24 in engagement with the notches of the ears.

By this arrangement the blade 10 may be quickly adjusted to form a shovel or spade as shown in Figs. 1 and 4, or to form a hoe or mattock as shown in Fig. 2, and without detaching any of the parts.

Formed in the shank 18 is a socket 27 in which a spring controlled pin 28 is seated, and adapted to be forced outwardly by its spring.

Slidable over the shank 18 is a tubular member 25 having a plurality of transverse notches 26 into one of which the spring controlled pin 28 is caused to enter, as the tubular member is moved over the shank and with a hand grip 29 at the outer end.

By this simple arrangement the handle may be adjusted longitudinally to any required extent within the range of the notches 26, to enable the implement to be collapsed for storage, or when not in use, and quickly extended when required, and as quickly arranged as a shovel or a hoe.

By providing a plurality of the apertures 26, the length of the handle may be adjusted in accordance therewith, as will be obvious.

The improved implement may be constructed of any size and of any suitable material and will be found very useful and convenient for the purposes described.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention, what is claimed as new is:—

An implement of the class described, comprising an earth engaging blade provided with an outturned upper end, a pair of spaced combined reinforcing and attaching plates secured against and extending transversely of the forward face of the blade in proximity to said outturned end, each of said attaching plates including a body portion having the inner end thereof formed with a forwardly projecting lug, said lugs spaced from and opposing each other and having their forward edges notched, a handle, means for pivotally connecting the shank of said handle between said lugs and a spring actuated means upon said shank to selectively engage said notches.

In testimony whereof, we affix our signatures hereto.

EDWARD H. COONEY.
HILDORE C. EKLUND.
SVEN T. WIPRUD.